(12) United States Patent
Suenaga et al.

(10) Patent No.: US 7,295,425 B2
(45) Date of Patent: Nov. 13, 2007

(54) MOLDING FOR ELECTROLYTIC CAPACITOR ANODE ELEMENT, MOLDING WITH SUBSTRATUM, PRODUCTION METHODS THEREFOR, AND PRODUCTION METHOD FOR ELECTROLYTIC CAPACITOR ANODE ELEMENT

(75) Inventors: Wataru Suenaga, Ageo (JP); Minoru Moriyama, Tokyo (JP); Akiko Miyamoto, Tokyo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 134 days.

(21) Appl. No.: 10/517,617

(22) PCT Filed: May 21, 2003

(86) PCT No.: PCT/JP03/06343

§ 371 (c)(1),
(2), (4) Date: Dec. 22, 2004

(87) PCT Pub. No.: WO2004/003948

PCT Pub. Date: Jan. 8, 2004

(65) Prior Publication Data

US 2005/0233194 A1   Oct. 20, 2005

(30) Foreign Application Priority Data

Jun. 27, 2002   (JP)   ............................. 2002-188529

(51) Int. Cl.
*H01G 9/00*   (2006.01)

(52) U.S. Cl. ...................... 361/523; 361/525; 361/528; 361/529; 361/534; 361/516; 29/25.01; 29/25.03

(58) Field of Classification Search ........ 361/523–525, 361/528–534, 516–519, 508–512; 29/25.01–25.03
See application file for complete search history.

(56) References Cited

U.S. PATENT DOCUMENTS

| | | | |
|---|---|---|---|
| 3,889,357 A | | 6/1975 | Millard et al. |
| 4,090,231 A | | 5/1978 | Millard et al. |
| 5,349,496 A | * | 9/1994 | Taniguchi et al. .......... 361/528 |
| 5,707,407 A | * | 1/1998 | Ohi et al. .................. 29/25.03 |
| 5,847,188 A | * | 12/1998 | Yokoyama et al. ......... 558/277 |
| 5,926,363 A | | 7/1999 | Kuriyama |
| 6,040,229 A | | 3/2000 | Kuriyama |

(Continued)

FOREIGN PATENT DOCUMENTS

CA   999350   11/1976

(Continued)

*Primary Examiner*—Nguyen T. Ha
(74) *Attorney, Agent, or Firm*—Edwards Angell Palmer & Dodge LLP

(57) ABSTRACT

The present invention provides a molding having excellent workability and a production method therefore. In addition, the present invention provides a molding with which a capacitor element having excellent electric properties can be obtained, and which has excellent workability that can be used to make a porous anode element for an electrolytic capacitor. The molding with a substratum has a sheet-shaped substratum and a molding which is provided on this sheet-shaped substratum such that the molding can be separated, in which the molding has a protective layer and a porous-body-forming layer, the protective layer includes resin as a main component, and the porous-body-forming layer includes valve action metal powder and binder resin.

17 Claims, 9 Drawing Sheets

U.S. PATENT DOCUMENTS

| | | | |
|---|---|---|---|
| 6,426,866 B2 * | 7/2002 | Shoji et al. | 361/523 |
| 6,556,427 B2 * | 4/2003 | Ohata et al. | 361/528 |
| 6,783,703 B2 * | 8/2004 | Monden et al. | 252/511 |

FOREIGN PATENT DOCUMENTS

| | | |
|---|---|---|
| DE | 2432163 A1 | 1/1975 |
| DE | 19738149 A1 | 3/1998 |
| FR | 2236260 | 1/1975 |
| GB | 1459647 | 12/1976 |
| JP | 50-36951 | 4/1975 |
| JP | 10-74668 | 3/1998 |

* cited by examiner

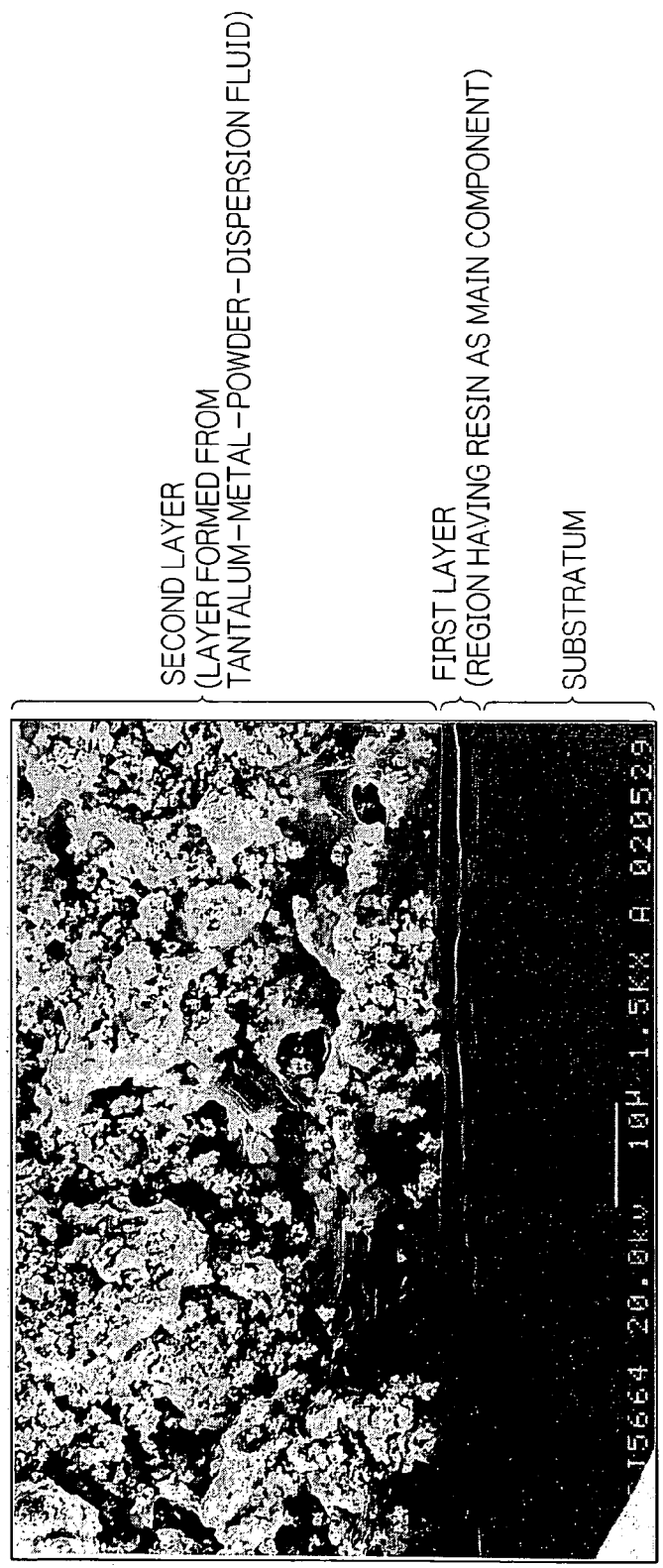

CK     ⊢──┤ 10um
1500x kV : 20 Tilt : 0

TaL     ⊢──┤ 10um
1500x kV : 20 Tilt : 0

C K 　　　⊢————⊣ 100um
250x kV:20 Tilt:0

C K ⊢———⊣ 10um
1500x kV : 20 Tilt : 0

C K ⊢———⊣ 10um
1500x kV : 20 Tilt : 0

MOLDING FOR ELECTROLYTIC CAPACITOR ANODE ELEMENT, MOLDING WITH SUBSTRATUM, PRODUCTION METHODS THEREFOR, AND PRODUCTION METHOD FOR ELECTROLYTIC CAPACITOR ANODE ELEMENT

TECHNICAL FIELD

The present invention relates to a molding with a substratum which has a molding comprising valve action metal such as tantalum and binder resin; and to a production method therefore, and within the aforementioned; to a molding with a substratum for sintering process and a production method therefore, more particularly, the present invention relates to a molding with a substratum, in which the molding is employed in sintering to form a porous sintered body for an electrolytic capacitor anode; and to a production method therefore.

BACKGROUND ART

In a porous body comprising valve action metal such as tantalum, niobium or the like, a dielectric layer comprising oxide with a controllable thickness can be formed in the surface of the porous body by using an anodic oxidation, and such porous bodies have been widely employed as anode elements for electrolytic capacitors by making use of the wide surface area of the porous body. Particularly as tantalum has high resistance to heat and corrosion, it has been employed as a sintered body for filament material, chemical equipment parts, artificial bone and the like, and its use as an electrolytic capacitor is overwhelming.

Technology in miniaturization of surface-mounted devices have progressed rapidly in recent years, and technologies for mounting to component boards in electronic devices such as cellular telephones, personal computers and digital cameras have been highly integrated. Under this background, various research efforts have also been conducted in the field of capacitor elements, which are electronic parts, catching up with the demand for a smaller, thinner, larger capacity product.

Among capacitor elements that are typically employed at the present time, in particular tantalum electrolytic capacitors have the property of enabling a large capacity in a small size, and have been greatly researched with the goal of further decreasing size and thickness.

Examples of materials having the same properties as tantalum metal, i.e., so-called valve action metals, include various metal materials like aluminum, niobium and titanium, however, tantalum metal is highly demanded for its heat resistance and forming capability of a dielectric layer.

As for a method for producing an electrolytic capacitor employing the aforementioned valve action metal powder such as tantalum for example, typically, the tantalum is used as an anode metal powder, and the tantalum metal powder and resin which functions as binder are filled in a metal die, and are subjected to pressure processing and chipping, to form a molding for anode element.

A component (typically a tantalum lead wire) which becomes the anode terminal is provided to the molding for an anode element. This lead wire is typically inserted within the tantalum metal powder set in the metal die, and is fixed in place by pressure molding of the tantalum metal powder.

An anode element obtained through the above steps then goes through a process to vaporize and remove the unnecessary resin therein by subjecting the element to high temperature heating treatment in a vacuum.

Through this process, in which the resin present in the tantalum metal powder is vaporized and removed and the tantalum metal particles are fused at their points of contact, a tantalum electrolytic capacitor anode element with a porous body is obtained.

A tantalum electrolytic capacitor anode element obtained in this way is dipped in a electrolytic bath, a prescribed DC voltage is applied, and a chemical conversion treatment is carried out, to form a dielectric layer comprising tantalum oxide on the surface of the tantalum metal powder, thereafter, a solid electrolyte coating of manganese dioxide or functional polymer coating is formed on the dielectric layer.

Next, after a process of forming a cathode layer using carbon and silver paste is carried out and resin outer sheathing is provided, to obtain the final tantalum electrolytic capacitor.

In response to the demands for smaller and thinner electrolytic capacitors, research has been proceeding to further decrease the size and thickness of the dimensions of the capacitor. The capacitor is made thinner, for example, so as to be embedded in the board=or to be laminated, so that it is possible to realize low Equivalent Series Resistance (ESR) and to improve high frequency properties. However, in conventional methods using a die, it is difficult to make a thin-type electrolytic capacitor anode element with a thickness of 0.5 mm or less efficiently, and moreover, it has also been difficult to form a large type electrolytic capacitor anode element even if the thickness is around 1 mm.

As for a method for making the aforementioned anode element thinner, Japanese Patent Application, First Publication No. Sho. 56-83022 discloses a method for producing an electrolytic capacitor anode element in which valve action metal powder, binder including a thermoplastic resin, and an organic solvent are mixed together to form a paste; and by using the paste, a sheet is formed (i.e., a molding in the form of a thin film), and lead wire is connected to the sheet; and a debinder treatment is carried out, and sintering is performed to obtain the desired product.

However, when forming a sheet by using a paste comprising a mixture of valve action metal powder, binder resin, and an organic solvent as described above, there were the following problems to be solved.

In particular, when an electrolytic capacitor anode element is made by sintering a molding for this purpose, it is preferable that the quantity of binder resin be limited to as small as possible in order to ensure good capacitor properties such as low residual carbon and small leakage current, however, the reduction of the blending amount of binder resin causes to the decrease of the mechanical strength of the sheet (molding) and to difficult handling. In some cases, yield may decline due to, for example, damage to a portion of the molding during the separation of molding from the substratum or after the separation of molding from the substratum, in the production process.

In other words, when the blending amount of the valve action metal powder is increased, the adhesive effect provided by the binder resin decreases, and in particular, when the element is made thinner, then the molding is more fragile, accordingly, the binder resin is required to be present at a specific proportional amount or greater.

On the other hand, if the blended binder resin is sufficient to ensure strength, the residual carbon increases as described above, and as a result, causes such problems as degradation in the electric properties of the capacitor anode element.

DISCLOSURE OF THE INVENTION

The present invention was conceived in view of the above-described circumstances and has as its objective the provision of a molding with a substratum, which has a molding having excellent workability, and a production method therefore, and particularly, the provision of a molding with a substratum for sintering process and a production method therefore. Moreover, the present invention aims to provide a molding with a substratum for sintering process having a molding with which a capacitor anode element with excellent electric properties can be obtained, and which has excellent workability that can be used to make a porous anode element for an electrolytic capacitor.

In order to solve the above-described problems, the molding with a substratum of the present invention has a sheet-shaped substratum and a molding that is provided on the sheet-shaped substratum such that the molding can be separated, and the molding has a protective layer and a porous-body-forming layer, in which the protective layer contains resin as a main component and the porous-body-forming layer contains valve action metal powder and binder resin.

The production method for producing the molding with a substratum of the present invention includes a step for forming a protective layer having resin as a main component on a sheet-shaped substratum, and a step for forming a porous-body-forming layer with valve action metal powder and binder resin on the protective layer, wherein the adhesive strength between the protective layer and the porous-body-forming layer is made to be greater than the adhesive strength between the sheet-shaped substratum and the protective layer.

The other production method for producing the molding with a substratum of the present invention includes a step for forming a coated layer on a sheet-shaped substratum by coating a paint for forming porous body including valve action metal powder, binder resin, and a solvent, and a step for forming a protective layer with resin as a main component in the surface of the coated layer caused by the settling of the valve action metal powder in the coated layer.

The present invention further provides a molding for a capacitor anode element that is provided with valve action metal layer comprising valve action metal powder and binder resin, and that has a sheet-like region for protecting the valve action metal layer, containing resin as a main component on at least one surface of the molding.

Since the molding of the present invention has a sheet-shaped region (protective layer) having resin as a main component in order to protect the porous molding layer having valve action metal powder and binder resin, this region functions as the reinforcement of the molding, making it possible to prevent the molding from crumbling and the like.

Since this layer-shaped region (protective layer) having resin as a main component for protecting the porous-body-forming layer may be provided to a small portion of the surface region of the molding, it is possible to decrease the residual carbon in the sintered body, and as a result, when this sintered body is then employed as a porous anode for an electrolytic capacitor, excellent electrical properties can be ensured for the electrolytic capacitor anode element.

BRIEF DESCRIPTION OF THE FIGURES

FIG. 8 is a SEM image of the cross-section of the molding with a substratum according to Example 1.

Figure 1:
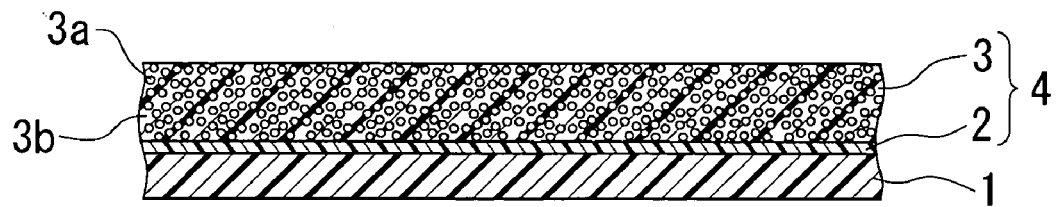
FIG. 1 shows an example of the production method for the molding with a substratum of the present invention, and is a cross-sectional view showing an arrangement in which a protective layer and a porous-body-forming layer are provided on the substratum.

BEST MODE FOR CARRYING OUT THE INVENTION (Production of Molding)

The production method for a molding with a substratum of the present invention is hereinafter explained by using a number of embodiments as examples.

Here, in the specification, the term "molding" shall be used to refer to a variety of forms prior to the sintering step, including both a molding with a substratum and a molding without a substratum. In the specification, the term shall be used without further modification when there is no doubt about the form, however, when it is desirable to make clear the relationship with the substratum, then the terms "with a substratum" or "without a substratum" will be added.

The term "molding element" refers to an arrangement in which a lead wire is attached to the aforementioned "molding without a substratum," and indicates the embodiment of the molding before sintering, when making the electrolytic capacitor anode element.

The term "anode element" indicates the conformation after sintering of the "molding element."

In the present specification, the "protective layer having resin as a main component for protecting the porous-body-forming layer" may be one that includes essentially no valve action metal powder, or may be one that includes valve action metal powder, provided that the resin concentration is enough to permit to protect the porous-body-forming layer.

Since the "layer having resin as a main component" depends on the properties of the employed material and on the conformation of the protective layer which relies on the method of production therefore, an all-inclusive definition of the "layer having resin as a main component" cannot be provided, however, for example, when tantalum is employed for the valve action metal, the resin concentration in the area of highest concentration thereof is 10% by weight or greater, and preferably 15% by weight or greater, it is preferable to set this concentration such that the function of protecting the porous-body-forming layer is sufficiently performed.

On the contrary, with regard to the porous-body-forming layer, having valve action metal powder as a main component, which becomes a porous body after sintering, as is determined later by the preferred blending ratios, the resin concentration is preferably 9% by weight or less, and more preferably 5% by weight or less, in the case where the valve action metal is Ta, for example.

In addition, the protective layer having resin as a main component may be present as an independent layer separate from the porous-body-forming layer, or may be separately formed and then laminated onto the porous-body-forming layer. Alternatively, this protective layer may be a layer with a high resin concentration that is formed by using resin concentration gradient in a surface layer of the porous-body-forming layer (for example, a layer which is formed in a unitary manner with the porous-body-forming layer, and which is present essentially as one part of the porous-body-forming layer, forming the surface of the porous-body-forming layer).

In other words, the protective layer having resin as a main component preferably can be formed as the surface layer of the porous-body-forming layer, or be formed as an independent layer (protective layer) which is adjacent to the porous-body-forming layer.

Here, when forming the protective layer having resin as a main component as the aforementioned surface layer of the porous-body-forming layer, the paint for forming the porous-body-forming layer can be used, and resin concentration gradient can be formed in the porous-body-forming layer, as explained below. Further, by using the paint for the porous-body-forming layer and a different paint having a higher resin concentration which is compatible with the paint for the porous-body-forming layer, and by forming a coated film with a two-layer structure (laminated body), and by making a mutually unitary structure with the layers formed from these two paints as a result, it is possible to make a protective layer having resin as a main component in which resin concentration gradient is formed in the unified layers.

Here, though the protective layer having resin as a main component may be formed in the surface layer of the molding, and may be formed in one or both surfaces of the molding, when employing the sintered body as a porous anode for an electrolytic capacitor, it is preferable to provide the protective layer in only one side of the molding for the purpose of reducing the residual carbon.

THE FIRST EMBODIMENT

The first embodiment is a production method for a molding in which a first layer being made of paint for a protective layer having resin as a main component, and a second layer being made of paint for a porous-body-forming layer, are formed on a substratum in this order, wherein the adhesive strength between the first layer and the second layer is made to be greater than the adhesive strength between the first layer and the substratum.

Figure 2:
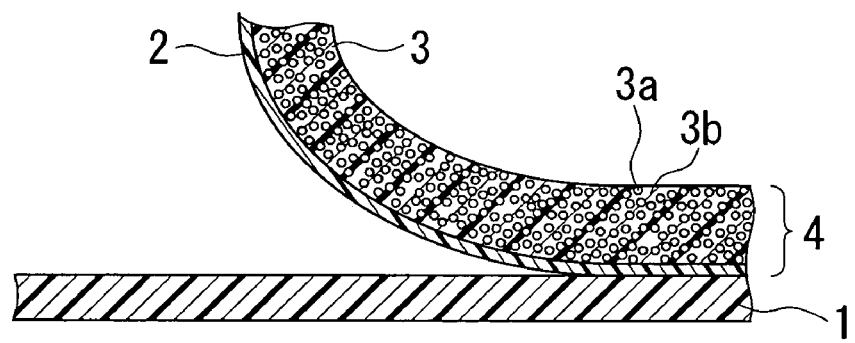
FIG. 2 is a cross-sectional view of the molding with a substratum shown in FIG. 1, showing the state when separating at the boundary between the substratum and the protective layer (layer-shaped region containing resin as a main component).

FIGS. 1 and 2 show a production method for a molding with a substratum according to the present embodiment.

First, a solution preferably containing resin and a solvent is coated onto a sheet-shaped substratum 1 and dried to form a protective layer 2, and a metal-powder-dispersion fluid containing valve action metal powder 3a, binder resin 3b, and a solvent is coated onto the protective layer 2, and dried to form a porous-body-forming layer 3.

Here, in addition to coating, it is also acceptable to employ a variety of methods, such as printing, to form the protective layer 2 or the porous-body-forming layer 3 by using the aforementioned solution or metal-powder-dispersion fluid.

In addition, opposite to the case shown in FIGS. 1 and 2, it is also possible to form previously the porous-body-forming layer 3 on the substratum 1 by using the metal-powder-dispersion fluid.

However, in this case, when coating the aforementioned solution onto the porous-body-forming layer 3 in order to form the protective layer 2 on the porous-body-forming layer 3, for example, the aforementioned solution might penetrate the porous-body-forming layer depending on the properties of the material, as a result, it may become impossible to obtain the protective layer region having resin as a main component. For this reason, it is typically easier to form previously the protective layer on the substratum.

In this way, opposite to the case shown in FIGS. 1 and 2, when first providing the porous-body-forming layer 3 on the substratum 1, and then forming the protective layer 2 on this porous-body-forming layer 3, it is preferable to provide a high viscosity to the solution containing the resin and the solvent for forming the protective layer 2, in order to prevent the solution from penetrating too much into the porous-body-forming layer 3 when coating the solution on the porous-body-forming layer 3.

Alternatively, it is also acceptable to form a separate protective layer on the other substratum, and then to laminate this layer on the porous-body-forming layer 3 by using a transferring method.

Next, when separating from the substratum 1, since the adhesive strength between the protective layer 2 and the porous-body-forming layer 3 is greater than the adhesive strength between the substratum 1 and the protective layer 2, as shown in FIG. 2, the protective layer 2 is pulled off from the substratum 1 keeping a unitary structure with the porous-body-forming layer 3, thereby a molding 4 is obtained in which the protective layer 2 having resin as a main component is provided on one surface of the porous-body-forming layer 3, i.e., on the surface of the molding 4.

Further, in the case that the binder resin 3b which forms the porous-body-forming layer 3 and the resin which forms the protective layer 2 are compatible, part or all (preferred, all) of the boundary between the binder resin 3b of the porous-body-forming layer 3 and the resin which forms the protective layer 2 disappears to form a unitary structure. As a result, as shown in FIG. 3, resin concentration gradient is formed towards the substratum 1 extending from the porousbody-forming layer 3 to the protective layer 2, which make a unitary structure with the porous-body-forming layer 3, and the resin concentration (concentration of organic compounds) gradually becomes higher in the direction from the second layer 3 to the first layer 2.

By having the protective layer 2 and the porous-body-forming layer 3 make a unitary structure in this way, the protective layer 6, which is essentially surface part of the unified porous-body-forming layer 5 and has resin as a main component is formed in the surface of the molding 4. As a result, it is possible to improve the mechanical strength of the molding 4.

Figure 3:
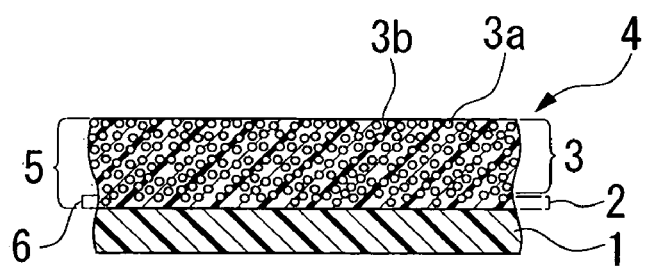
FIG. 3 is a cross-sectional view of an example in which the resin of protective layer is solved and included in the porous-body-forming layer because of the compatibility and these are formed into a unitary structure, in the molding with a substratum according to the present invention.

As shown in FIGS. 2 and 3, whether the separation occur at the boundary surface of the substratum 1 and the protective layer 2 (or 6) can be determined by measuring the ratio Catm/Xatm at the separating surface of molding 4, where Catm denotes the amount of carbon atoms present and Xatm denotes the amount of valve action metal atoms X present, as the count ratio of the electric signal pulse corresponding to their respective characteristic x-rays, by applying microanalytical methods such as electron probe microanalysis (EPMA) or SEM-EDS.

In other words, when the protective layer 2 or 6 is formed, since the protective layer 2 or 6 comprises an organic compound having resin as a main component, the ratio Catm/Xatm on the substratum 1 side becomes greater than on the surface of the opposite side of molding 4.

In the protective layer having resin as a main component, the ratio Catm/Xatm is preferably 1.0 or greater, more preferably 1.2 or greater, and most preferably 1.3 or greater.

In addition, since it is possible to maintain the form of molding 4 (porous-body-forming layer 5 or porous-body-forming layer 3 and protective layer 2) in the subsequent processing steps to the sintering step by forming the protective layer 2 or 6, so that workability can be improved, it is possible to confirm the presence of the protective layer 2 or 6 by the improvement of aptitude for processing in testing of production workability.

THE SECOND EMBODIMENT

The second embodiment is a production method for a molding in which a protective layer having resin as a main component is formed by forming a coated film on a substratum by using a metal-powder-dispersion fluid containing valve action metal powder, binder resin, and a solvent, and settling down the valve action metal powder in the coated film to form the region where resin is concentrated in the surface of the coated film (i.e., the side opposite the substratum).

Figure 4:
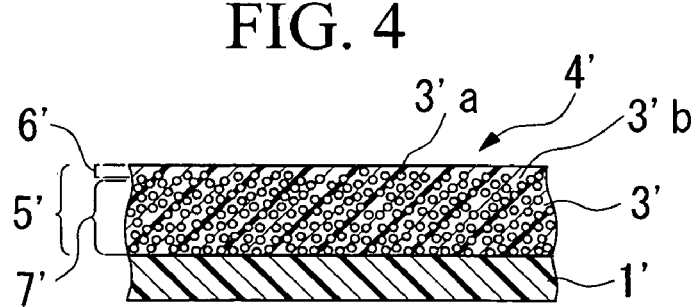
FIG. 4 is a cross-sectional view of a molding with a substratum showing an example in which a protective layer is formed in the surface of the porous-body-forming layer which is opposite to the substratum.

For example, as shown in FIG. 4, a metal-powder-dispersion fluid including valve action metal powder 3'a and binder resin 3'b is coated on a substratum 1' that is the same substratum 1 shown in FIG. 1, to form a film 3', and in this film 3', the valve action metal powder 3'a is settled down onto the substratum 1' side, to form a protective layer 6', having resin as a main component, in a surface layer of the coated film 3'. Under this protective layer 6' there is a porous-body-forming layer 7' containing valve action metal powder as a main component.

Here, in addition to forming this coated film 3' by coating a metal-powder-dispersion fluid, it is also possible to form that using various other methods such as printing, etc.

In this case, as in the case shown in FIG. 3, the gradient of the resin concentration is formed within the coated film 3'. In this case, the concentration gradient of the binder resin 3'b is formed, thereby, a protective layer 6' containing resin as a main component is formed. In other words, the protective layer 6', which is essentially part of the porous-body-forming layer 5', is formed in the surface layer.

For this reason, even if the substratum 1' is ripped away, a suitable amount of strength is provided by the effect of the protective layer 6' which is formed in the surface layer of the porous-body-forming layer 5', as a result, the effect of improved workability of the molding 4' is obtained.

In order to form the protective layer 6' by settling down the valve action metal in this way, it is preferable that the viscosity of the metal-powder-dispersion fluid be 5 Pa·s or less, and more preferably 1 Pa·s or less. The measurement of this viscosity is carried out using a B-type viscometer, and the measured temperature is the temperature during manufacturing operation. If a porous-body-forming layer is formed by a generally used method by using a metal-powder-dispersion fluid which has low viscosity as mentioned, then, it is natural that the valve action metal powder gradually settles down in the coating layer of the metal-powder-dispersion fluid during drying process thereof, and concentration gradients of the resin and valve action metal powder are formed.

In this present embodiment, only with the substratum 1' and a paint for the porous-body-forming layer 5', the protective layer 6' can be formed as a result of adjusting the viscosity during coating, therefore, the sort of material used and production process could be more simpler and preferable.

In addition, in either the first and the second embodiments, as shown in FIG. 2, prior to separating the substratum 1 in manufacturing process, it is preferable to slit the molding 4 with the substratum 1 shown in FIG. 1 to a predetermined width, since this provides a remarkable improvement in the continuous workability in continuous manufacturing of the molding for an electrolytic capacitor anode element. In addition, this is also preferable for the perspective that there is no useless part, the so-called "lug", generated during the punching process. Further, when coating a metal-powder-dispersion fluid on the first layer 2, it is also possible to coat the fluid in a stripe pattern and dry, and then cut along the coated shape.

The various components employed in the production of a molding with a substratum described in the summary above will now be explained in detail, along with the production steps.

(Preparation of the Substratum)

Materials which can be used as a sheet-shaped substratum include plastic films and sheets comprising, for example, polyethylene film, polypropylene film, polyvinyl chloride film, polyvinylidene chloride film, polyethylene naphthalate film, polyvinyl alcohol film, polyethylene terephthalate (PET) film, polycarbonate film, nylon film, polystyrene film, ethylene vinyl acetate copolymer film, ethylene vinyl copolymer film, and the like; metal sheets such as aluminum; paper or impregnated paper; and composites consisting of the aforementioned various materials. The most suitable from among these is employed after taking into consideration the adhesive and peeling properties that will result from the resin which makes up the layer that is formed on the substratum. Materials other than the aforementioned may be used without particular restriction, so long as they are equipped with the required strength and flexibility, more preferably, peeling properties. From the perspective of strength, solvent resistance, and price, PET film is typically employed.

The thickness of the substratum is not particularly restricted but may be, for example, 5 μm to 500 μm, and preferably 10 μm to 100 μm.

It is acceptable to use a peelable substratum as the aforementioned substratum so that the boundary between the substratum and the molding can be easily separated. The peelable substratum is one in which the film-shaped material itself has peelable properties, or in which there is a peelable layer formed on the surface of the film-shaped material. Here, when the surface on the substratum side of the molding has peelable properties with respect to the substratum, it is possible to smoothly carry out processing without using the peelable substratum.

In the case where, for example, PET film is employed as the substratum as described below, a layer having acrylic resin or polyvinyl acetal resin as a main component is formed as the first layer coated on the substratum, thereby making it possible to provide excellent peelablity between the first layer and the substratum.

(Formation of Protective Layer Having Resin as Main Component)

Although selection of the resin employed in the protective layer will depend on such factors as the method of production, from the perspective of their sepatating properties with PET, resins such as polyvinyl alcohol resin, polyvinyl acetal resin, butyral resin, or acrylic resin are preferably employed. Thus, resin including one or more selected from this group is preferred. In these resins, acrylic resin is particularly desirable from the perspective of decreasing residual carbon.

Here, as shown in FIG. 4, when forming a protective layer having resin as a main component by using a metal-powder-dispersion fluid and settling down valve action metal powder, a protective layer region is formed by binder resin for the valve action metal powder. In this case, it is desirable to employ resin disclosed above as the binder resin.

In these resins, acrylic resin in particular tends to attain complete decomposition combustion when sintered in the presence of a metal powder, and easily forms a porous metal sintered body having a low residual carbon.

Further, as described above, when providing a protective layer as the first layer and a porous-body-forming layer as the second layer on the sheet-shaped substratum in this order, and making the adhesive strength between the protective layer and the porous-body-forming layer greater than the adhesive strength between the sheet-shaped substratum and the protective layer, it is necessary to set the adhesive strength so that the aforementioned conditions are satisfied.

Since the adhesive strength varies depending on various conditions such as the type of resin forming each layer (resin compatibility), coating speed, and so forth, it is preferable to carry out testing under actual production conditions and evaluating, and select that which satisfies the desirable properties.

Although there are no restrictions in particular, when employing PET film as the substratum, the following types of resin combinations may be cited specifically:

A combination of acrylic resin for the first layer (protective layer), and same type of acrylic resin as the first layer for the second layer (porous-body-forming layer); or a combination of polyvinyl acetal resin for the first layer (protective layer), and acrylic resin for the second layer (porous-body-forming layer).

Here, when the same type of resin is employed for the protective layer and the porous-body-forming layer, the boundary between the protective layer 2 and the porous-body-forming layer 3 disappears as shown in FIG. 3 due to compatibility, and resin concentration gradient is formed.

By eliminating the boundary in this way, the first layer and the second layer form a unitary structure, and delamination between the layers does not occur, so this is preferable.

However, the degree of which a solvent in a paint which is employed in the formation of the porous-body-forming layer dissolve the resin in the protective layer having resin as a main component is high, there is a possibility that the thickness of the protective layer containing resin as a main component will itself become thinner. For this reason, it is preferable that the resin employed contains a component with a molecular weight of 250,000 or more, and more preferably that the aforementioned component with a molecular weight of 250,000 or more be included in the amount of 30% by weight or more of the total resin.

The protective layer having resin as a main component can be formed on the sheet-shaped substratum 1 using a variety of methods such as an example shown in FIG. 1.

Conventionally known roller coating methods may be cited as examples of coating methods, including, specifically, air doctor coating, blade coating, rod coating, extrusion coating, air knife coating, squeegee coating, impregnation coating, reverse roll coating, transfer roll coating, gravure coating, kiss coating, cast coating, and spray coating.

Further, a solution in which the optimal resin has been dissolved in a suitable concentration can be employed. The same solvents that form the metal-powder-dispersion fluid described below may be employed for the solvent here.

Since there are various embodiments of the protective layer itself, it is difficult to clearly prescribe a thickness for the protective layer having resin as a main component, therefore, the thickness is not particularly restricted, however, provided it is within a range in which the molding maintains its shape without being destroyed at least during the time period until sintering is initiated.

For example, a range of 1 μm to 20 μm is preferred, and within this range, there is not a large increase in the total amount of resin in the molding, and the amount of residual carbon after sintering does not increasing greatly. Specifically, the range of 1 μm to 10 μm is preferred because this does not have much influence to the amount of residual carbon left after sintering, and the strength of the coating can be maintained to a suitable extent.

(Formation of Porous-body-forming Layer)

The metal-powder-dispersion fluid that is used to form the porous-body-forming layer can be produced by mixing and dispersing valve action metal powder, binder, and a solvent, as well as additive agents as necessary.

Valve Action Metal Powder

Powders of such valve action metals as tantalum, aluminum, niobium, titanium, and the like can be used as the valve action metal powder. In these valve action metals, tantalum and niobium are optimal, with the employment of tantalum being particularly preferably.

The following explanation will employ tantalum metal powder as the example.

The tantalum metal preferably has a purity of 99.5% or greater, with an average primary particle diameter in the range of 0.01 to 5.0 μm being preferred, and an average primary particle diameter in the range of 0.01 to 2.0 μm being particularly preferred.

Binder Resin

Solvent-soluble binder resin may be employed as the binder resin. Examples of suitable binder resins that may be cited include polyvinyl alcohol resin, polyvinyl acetal resin, butyral resin, phenol resin, acrylic resin, urea resin, vinyl acetate emulsion, polyurethane resin, polyvinyl acetate resin, epoxy resin, melamine resin, alkyd resin, nitrocellulose resin, natural resins, and the like. These resins may be used alone or in combinations of two or more.

As in the case of the protective layer having resin as a main component, polyvinyl alcohol resin, polyvinyl acetal resin, butyral resin, and acrylic resin are suitably employed among the resins cited above.

Among these, acrylic resin is preferred since it is almost entirely decomposed during binder processing in a vacuum so that there is little residual carbon, and it is thus possible to prevent an increase in leakage current from the electrolytic capacitor when making an electrolytic capacitor anode element from the molding.

It is preferable that the glass transition point of the aforementioned resin be 50° C. or less, and more preferably below room temperature. Since when the glass transition point is 50° C. or less, it is possible to provide flexibility to the porous-body-forming layer 3 shown in FIGS. 1 and 2, thereby the molding is not readily destroyed and handling thereof is improved, it is preferable that the glass transition point is 50° C. or less.

Here, as was discussed above in the explanation of the protective layer having resin as a main component, it is likewise preferable to select the binder resin so as to satisfy the adhesive strength relationship.

In the case of tantalum metal powder, for example, the amount of the binder resin employed is preferably in the range of 0.01 to 30 parts by weight, and more preferably 0.01 to 15 parts by weight, per 100 parts by weight.

In the case in which the amount of binder resin compounded is too large, the amount of residual carbon after sintering will increase and, for example, when making an electrolytic capacitor anode element from the molding, there is a risk that such undesirable circumstances will occur as a deterioration in the capacitor properties.

Solvent

Examples of solvents which may be cited include water, or alcohols such as methanol, 2-propanol (isopropyl alcohol), and diethylene glycol; cellosolves such as methyl cellosolve; ketones such as acetone, methylethylketone, and isophorone; amides such as N,N-dimethylformamide; esters such as ethyl acetate; ethers such as dioxane; chlorinated solvents such as methyl chloride; aromatic hydrocarbons such as toluene and xylene; and the like. These solvents may be used alone or in combinations of two or more.

The amount of the solvent is set to a degree such the process of coating the metal-powder-dispersion fluid can be carried out smoothly.

In addition to the aforementioned tantalum metal powder, binder resin, and solvent, various types of suitable additives can be mixed in the metal-powder-dispersion fluid employed, to provide suitable properties for coating or printing the metal-powder-dispersion fluid to the substratum surface, with the purpose of stably maintaining the metal powder dispersion or flow properties.

Examples of suitable additives include dispersing agents such as phthalic acid esters, phosphoric esters, and fatty acid esters; plasticizers such as glycols; low boiling point alcohols; defoaming agents such as silicon systems and non-silicon systems; silane coupling agents; titanium coupling agents; and dispersing agents such as SOLSPERSE and quaternary ammonium salts, and these may be suitably used as necessary. In particular, by employing a fatty acid ester having a melting point of 30° C. or less, it is possible to improve the workability of the molding that is formed from the metal-powder-dispersion fluid, so that damage or defects to portions of the molding during manufacturing become less likely to occur. The amount of these additive agents employed is, for example, in the case of tantalum, preferably in the range of 0.01 to 5.0 parts by weight with respect to 100 parts by weight of the tantalum metal powder.

Method for Formulating Metal-powder-dispersion Fluid

The aforementioned valve action metal powder, solvent, solvent-soluble binder resin, and additives to be mixed in as needed, are added all at once, or respectively in sequence, and these are then dispersed using various kneading and dispersing instruments, to obtain the metal-powder-dispersion fluid.

For kneading and dispersing, such machines may be employed as an agitator; roll kneaders such as double or triple roll kneaders; blade kneaders such as vertical kneaders, pressure kneaders, and planetary mixers; dispersing machines such as ball-type rotating mills, sand mills, and grinding machines; ultrasonic dispersers; nanomizers, and so forth.

Blending Example for Dispersion Fluid of Valve Action Metal Powder

Regarding the mixing ratio for the dispersion fluid of valve action metal powder, an example may be cited of 0.01 to 30 parts by weight, and preferably 0.01 to 15 parts by weight, of binder, 5 to 160 parts by weight of solvent, and 0 to 5 parts by weight of additive, with respect to 100 parts by weight tantalum metal powder.

The viscosity of the dispersion fluid of the valve action metal powder is 1 to 1000 Pa·s, and preferably 5 to 100 Pa·s. Here, when employing a production method in which the dispersion fluid of the valve action metal is coated on a substratum, the valve action metal is settled down, thereby a protective layer having resin as a main component is formed in a surface layer of a porous-body-forming layer, it is preferable that the viscosity of the dispersion fluid of the valve action metal powder be 5 Pa·s or less, and more preferably 1 Pa·s or less. A B-type viscosimeter was used as the method for measuring viscosity, and the measured temperature is the temperature during operations.

Formation of Anode Forming Layer

The dispersion fluid of the valve action metal powder obtained in this way is coated on the substratum in accordance with the production method employed. For example, after forming the protective layer 2 on the sheet-shaped substratum 1 as shown in FIG. 1 and described above, the aforementioned metal-powder-dispersion fluid is coated on the protective layer 2 and dried, to obtain the porous-body-forming layer 3. As a result, the molding 4 including the porous-body-forming layer 3 and the protective layer 2 having resin as a main component is obtained.

As a method for coating the dispersion fluid of the valve action metal powder, various coating methods can be employed in the same manner as for the separating layer described above.

When drying the dispersion fluid of the valve action metal powder, warm air at a temperature in the range of preferably 40 to 120° C. is employed, to volatize the solvent in the dispersion fluid. After volatizing the solvent in this way, the molding with the substratum can be wound into a reel. In other words, since the first layer which functions as a protective layer is present, even if the molding is wound into a reel, the molding is not damaged and does not fall off from the substratum. For this reason, it is possible to form a molding on a substratum using a continuous coating process while winding the coated molding with the substratum into a reel.

The thickness of the molding 4 can be optimally set. In the case in which forming a porous anode for an electrolytic capacitor using a sintered body, it is possible to optimally set the thickness of the molding based on the desired capacitance that is required for the electrolytic capacitor, and the thickness of the coating of the dispersion fluid of the metal powder before drying (wet thickness) can be thinned to a range of several μm to 300 μm.

Generally, in order to form an electrolytic capacitor anode element corresponding to a thin-type electrolytic capacitor, it is more preferable that the porous-body-forming layer have a dry thickness of 0.5 mm or less. Moreover, the dry thickness is preferably 0.4 mm or less, more preferably 0.3 to 0.05 mm, and most preferably 0.2 to 0.05 mm.

(Operation of Slitting)

Slitting Method

Next, the molding 4 shown in FIG. 1, preferably with the sheet-shaped substratum 1*a* is slit to a predetermined width.

Conventionally known methods may be employed as the slitting method, including for example, a laser cutter method, a shear cutter method employing a shearing effect that moves between a knife and a roller, and the like. Shear cutters have good cutter accuracy, and are also good for cutting the thick material. A rotary cutter having a plurality of blades can also be employed to make a slit.

After coating the dispersion fluid of a metal in stripe state on a first layer 2 shown in FIG. 1, drying and then cutting along the coated shape, the coated material can be wound into a reel. When coating in stripe state, it is necessary to slit along the coated shape after drying. Slitting can be carried out according to the same methods as described above.

The molding obtained in this manner is uniformly formed on the substratum, and the film thickness distribution is narrow, and there is superior flexibility and bendability. As a result, the molding can be easily wound into the reel with the sheet-shaped substratum without occurring positional deviations. The molding for a sintered body that is wound into a reel after slitting in this way offers superior easiness for storage and transportation.

(Production of an Electrolytic Capacitor Anode Element)

An electrolytic capacitor anode element can be made by using the molding of the present invention formed by the method described above. The concrete method will be described below.

For example, the electrolytic capacitor anode element employing the molding of the present invention can be made as described below.

Figure 5:
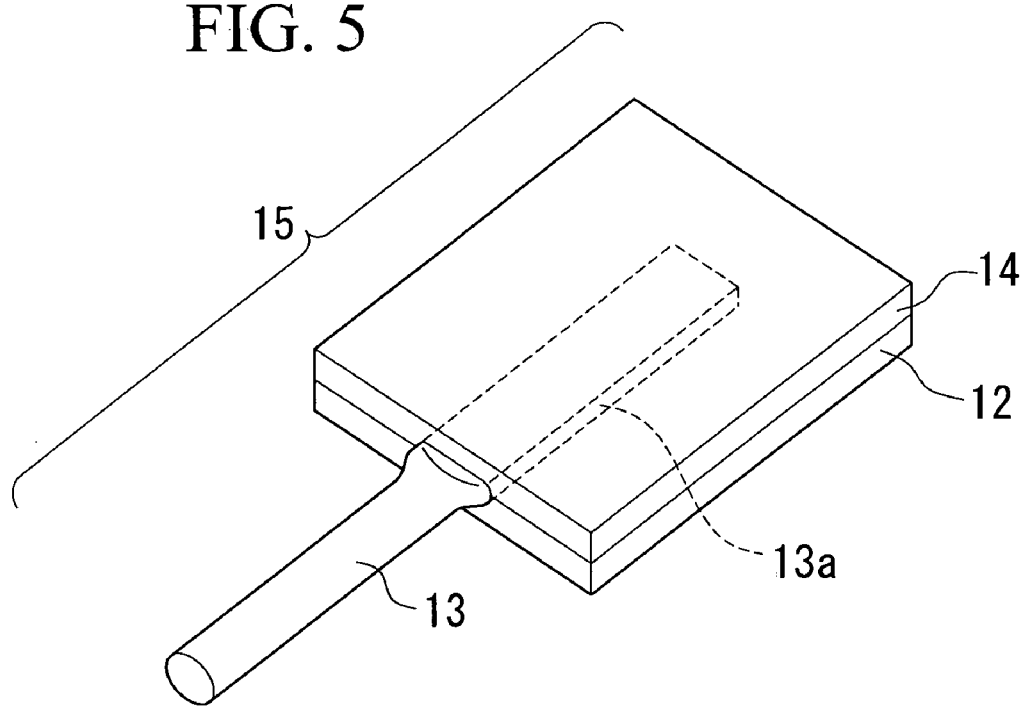
FIG. 5 is a view of an example explaining the method for producing the electrolytic capacitor anode element according to the present invention, and is a perspective view of the molding element obtained by holding a flat lead wire between two sheets.

First, the molding is separated from the substratum, and cut to a prescribed length, thereafter, as shown in FIG. 5, a lead wire, preferably a flat component 13*a* of a flat lead wire 13, is placed on thereof, and another molding 14 is stacked on them, suitable pressure processing is carried out as necessary, and the two moldings 12, 14 and the flat lead wire 13 are closely adhered together, thereby, a molding element 15 for an electrolytic capacitor anode element (hereinafter referred to simply as "molding element 15") is formed.

By adjusting the slitting width in advance so that it coincides with the width of the electrolytic capacitor anode element that is to be formed by sandwiching the lead wire and applying pressure treatment, it is possible to obtain molding of the desired size for electrolytic capacitor anode element, simply by cutting the slitted molding to a prescribed length. As compared to a method in which a molding of the desired size is punched out from a wide sheet-shaped molding, this method does not generate excess parts to be wasted from the molding, thus this method offers good production efficiency and is suitable to mass production.

Because the molding of the present invention has a protective layer having resin as a main component for protecting the porous-body-forming layer, the molding is not damaged nor does it fall from the substratum, during slitting or during winding after slitting, moreover, the molding is not readily damaged during pressure processing to sandwich a lead wire between moldings.

The aforementioned flat lead wire comprises valve action metal such as tantalum, and at least the portion that is embedded in the anode element, or the entire part, is made to be flat. This flat lead wire can be formed by flattening at least a portion of a tantalum wire by using pressure molding. The thickness and width of the flat portion of the flat lead wire can be optimally set on the grounds that the thickness of the anode element to be produced, the strength of the lead wire, and so forth, and it is preferable to flatten this portion to a thickness, the range of which is 5 to 70% of that of the molding.

Sintering Process

Figure 6:
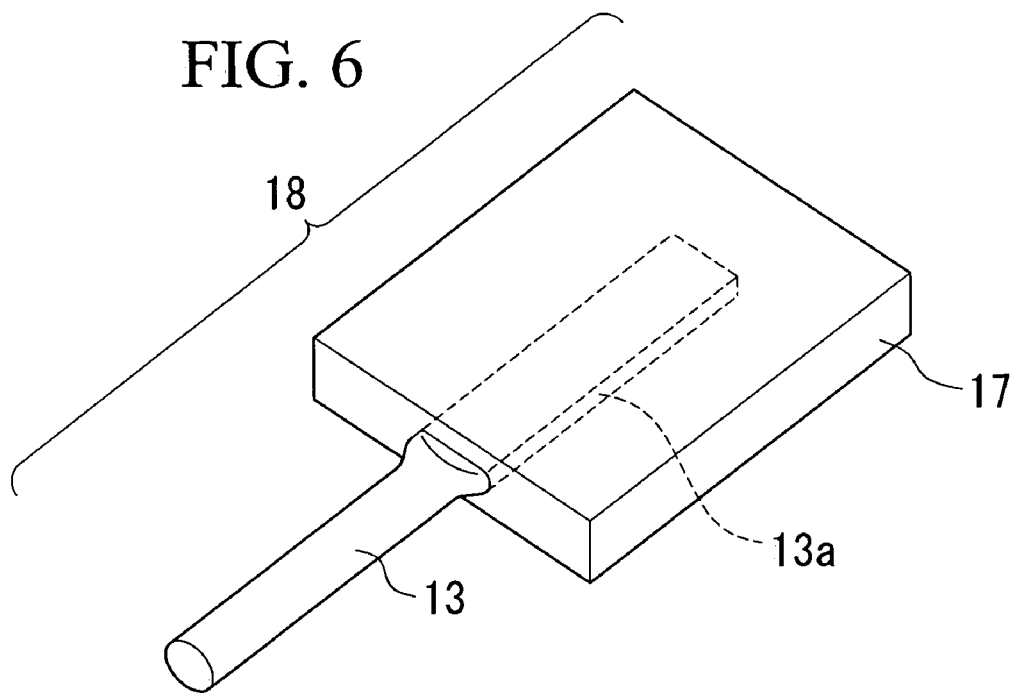
FIG. 6 is a perspective view of the electrolytic capacitor anode element that is obtained by sintering the molding element for an electrolytic capacitor anode element.

Next, the molding element 15 for an electrolytic capacitor anode element is dried as necessary, and the organic material (binder) is removed by a heat treatment at approximately 300 to 600° C. in a vacuum, after that, a high-temperature heat treatment (sintering) at around 1200 to 1600° C. is further carried out for approximately 10 to 30 minutes, thereby the tantalum metal particles are fused together, and the tantalum metal powder and the lead wire, preferably flat lead wire 13, are fused. As a result of these treatment, a tantalum electrolytic capacitor anode element 18 is produced, having a structure in which the lead wire 13, preferably the flat component 13*a* of the flat lead wire, is embedded inside a thin, rectangular tantalum porous sintered body 17, as shown in FIG. 6. Thus-obtained tantalum electrolytic capacitor anode element 18 has an arrangement such that the tantalum porous sintered body and the lead wire 13 are strongly adhered together.

(Production of Electrolytic Capacitor)

In order to produce a tantalum electrolytic capacitor using a tantalum electrolytic capacitor anode element 18, the anode element 18 is immersed in an electrolyte bath, a prescribed direct current voltage is applied to the anode element 18 to carry out a chemical conversion treatment, thereby a tantalum oxide dielectric layer is formed in the surface of the anode element 18.

After forming the oxide film, a solid state electrolyte such as a manganese dioxide layer or a functional polymer layer is formed on the oxide film.

Figure 7:
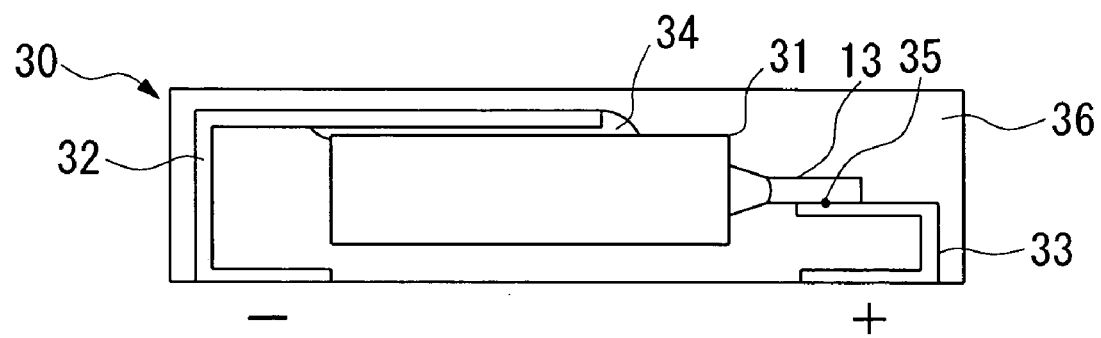
FIG. 7 is a schematic view showing an example of the electrolytic capacitor obtained by using the electrolytic capacitor anode element according to the present invention.

On the thus-obtained capacitor element 31 in which the tantalum oxide layer, and the manganese dioxide layer or the functional polymer layer are formed, a carbon (graphite) layer and a silver paste layer are formed, and as shown in FIG. 7, for example, one end of an anode terminal 32 is connected to the surface of this capacitor element 31 by solder 34, at the same time, the end portion of a flat lead wire 13 is connected to an anode terminal 33 by spot welding (joining point is indicated by numeric symbol 35), after which resin sheathing 36 is executed by, for example, resin molding or by soaking in a resin solution, resulting in forming a tantalum electrolytic capacitor 30.

The production method of the present invention can be also applied to the production of a laminated electrolytic capacitor. This type of laminated electrolytic capacitor can be formed by laminating an extremely thin electrolytic capacitor produced according to the production method of the present invention and then joining them.

EXAMPLES

The present invention will now be explained in detail using examples.

(Formulation of Tantalum-metal-powder-dispersion Fluid)

The following two types of blending compositions were each poured in a 100 cc plastic bottle, and kneed for 1 hour using an oscillator (paint vibrator), thereby tantalum-metal-powder-dispersion fluids (A), (B) were obtained.

Dispersion Fluid (A):

50 g of tantalum metal powder having an average primary particle diameter of 0.5 μm;

6.0 g (2.5 g) of acrylic resin "NCB-166" (manufactured by Dainippon Ink and Chemicals, Inc.) as the binder resin (solid weight is indicated by number within parenthesis);

5.5 g of mixed solvent of cyclohexanone and toluene as the solvent; and 50 g of 3 mm diameter steel balls.

Dispersion Fluid (B):

50 g of tantalum metal powder having an average primary particle diameter of 0.5 μm.

6.0 g (2.5 g) of acrylic resin "NCB-166" (manufactured by Dainippon Ink and Chemicals, Inc.) as the binder resin (solid weight is indicated by number within parenthesis);

12.9 g of mixed solvent of cyclohexanone and toluene as the solvent; and 50 g of 3 mm diameter steel balls.

(Production of Molding for Electrolytic Capacitor Anode Element)

Example 1

A toluene solution including 20% by weight of solid component of acrylic resin "IB-30" (manufactured by FUJIKURA KASEI Co., Ltd., component substance: isobutylmethacrylate, weight average molecular weight: 200,000 to 300,000) was developed over a PET film 50 μm thick using a #16 wire bar to provide a protective layer having a thickness of 4 μm.

Next, the tantalum-metal-powder-dispersion fluid (A) was developed over the above first layer using a 450 μm deep applicator, to obtain a dried coated film of the tantalum-metal-powder-dispersion fluid (A) (porous-body-forming layer).

An image of the cross-section of the thus-obtained molding with a substratum for an electrolytic capacitor anode element is shown in FIG. 8.

As is clear from this image, because the binder resin for the porous-body-forming layer and the resin employed in the protective layer include compatible resins, a cross-section is obtained of an electrolytic capacitor anode element in which a portion of the boundary between the protective layer and the porous-body-forming layer has disappeared, and a protective layer contains high concentration of resin.

Figure 9A:
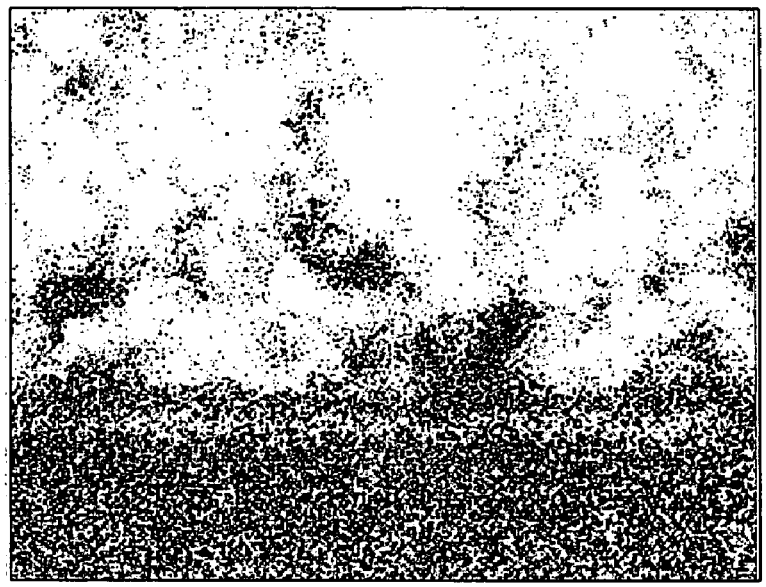
FIGS. 9A and 9B are views of mapping data for tantalum atoms and carbon atoms, respectively, in the cross-section shown in FIG. 8.
Figure 9B:

The mapping date for the carbon atoms and the tantalum atoms is shown respectively in FIGS. 9A and 9B. Here, the mapping data is obtained by measuring K line of carbon and L line of tantalum using SEM-EDS. The detector employed was manufactured by EDX, and the time constant and other measured conditions were carried out using standard measurement conditions of EDX.

SEM-EDS was used to measure the ratio of the number of atoms Catm/Taatm on the substratum side surface (the side where the protective layer having resin as a main component is formed) and the atomic ratio Catm/Taatm on the opposite surface of the molding for the electrolytic capacitor anode element, where Taatm is the amount of tantalum atoms present and Catm is the amount of carbon atoms present, as a result, the values 1.49 to 3.50 and 0.65 to 0.73, respectively, were obtained.

Example 2

A molding for an electrolytic capacitor anode element was prepared in the same manner as in Example 1, with the exception that an acrylic resin having the same structural composition as "IB-30" with a weight average molecular weight of 230,000 to 290,000 in the amount of 75% by weight, and an acrylic resin having the same component substances as "IB-30" with a weight average molecular weight of 70,000 to 90,000 in the amount of 25% by weight were employed as the acrylic resin employed in the first layer, and the Catm/Taatm in the surfaces of the molding on the substratum side and on the opposite side was measured in the same way as in Example 1, and found to be 1.25 to 1.41 and 0.64 to 0.74, respectively.

Example 3

A molding for an electrolytic capacitor anode element was prepared in the same manner as in Example 1, with the exception that an acrylic resin having the same component substances as "IB-30" with a weight average molecular weight of 230,000 to 290,000 in the amount of 50% by weight, and an acrylic resin having the same structural composition as "IB-30" with a weight average molecular weight of 70,000 to 90,000 in the amount of 50% by weight were employed as the acrylic resin employed in the first layer, and the Catm/Taatm in the surfaces of the molding on the substratum side and on the opposite side was measured in the same way as in Example 1, and found to be 1.08 to 1.28 and 0.37 to 0.42, respectively.

Example 4

The tantalum-metal-powder-dispersion fluid (B) was spread with using an applicator having a depth of 450 μm on a PET film 50 μm thick as a substratum, and dried to obtain a dried layer of the tantalum-metal-powder-dispersion fluid (B) having a thickness of 200 μm.

Figure 10:
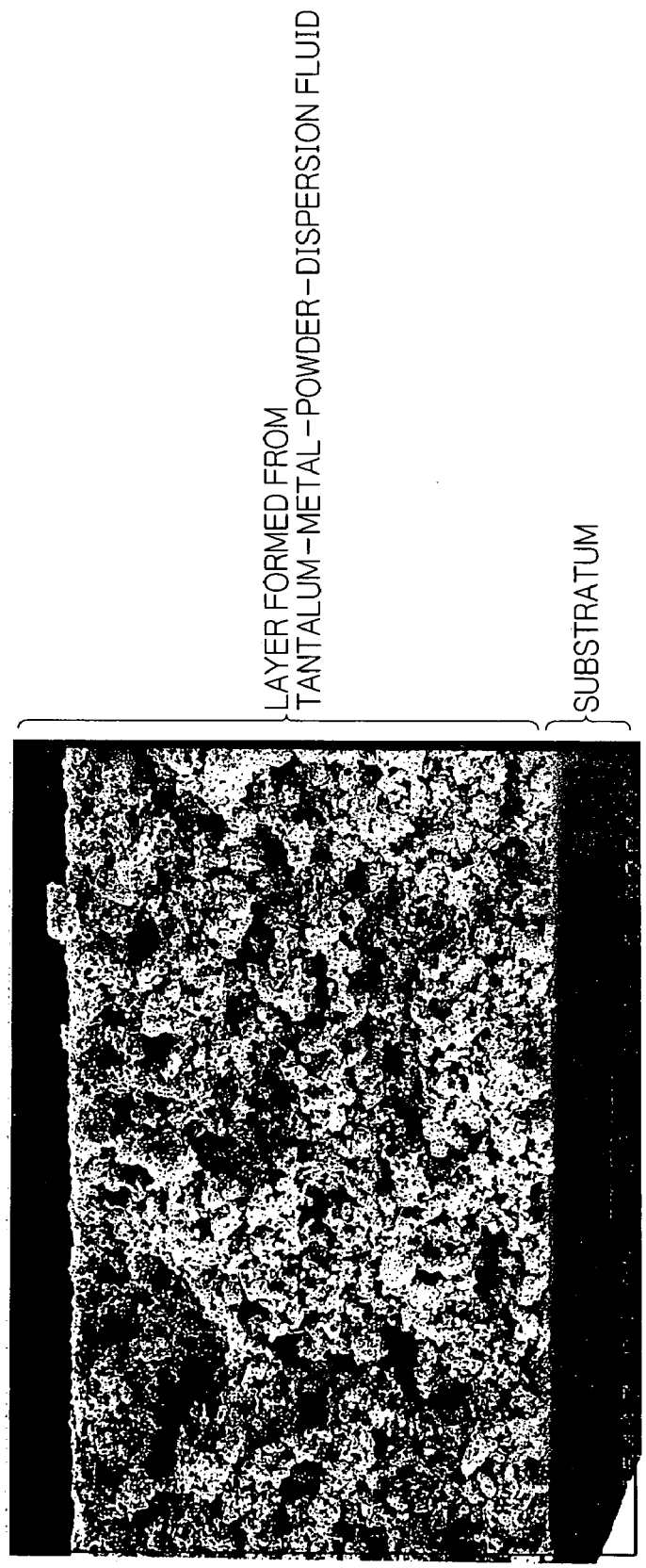
FIG. 10 is a SEM image of the cross-section of the molding with a substratum according to Example 2.

An image of the cross-section of the obtained molding with a substratum for an electrolytic capacitor anode element is shown in FIG. 10.

As is clear from this image, the tantalum metal powder in the porous-body-forming layer is settled down to the PET film side, and the concentration of the binder resin becomes higher in the direction to the surface of the porous-body-forming layer, so that a cross-section of the molding for the electrolytic capacitor anode element was obtained in which a protective layer having high concentration of resin as a main component was formed near the surface.

Figure 11:
FIG. 11 is a view of mapping data of carbon atoms in the cross-section shown in FIG. 10.

Mapping of these carbon atoms is shown in FIG. 11. Here, the mapping data was obtained using the same measurement conditions as in Example 1.

The ratio of the number of atoms Catm/Taatm for the amount of tantalum atoms present and the amount of carbon atoms present on the substratum side surface of the molding for the electrolytic capacitor anode element, and the ratio of the number of atoms Catm/Taatm on the opposite surface (the side where the protective layer having resin as a main component is formed) was measured, and found to be 0.46 to 0.69 and 1.29 to 3.50, respectively.

Comparative Example 1

A dried layer (porous-body-forming layer) made of tantalum-metal-powder-dispersion fluid (A) having a thickness of 200 μm was obtained in the same manner as Example 1, with the exception that a protective layer having resin as a main component was not formed.

Figure 12:
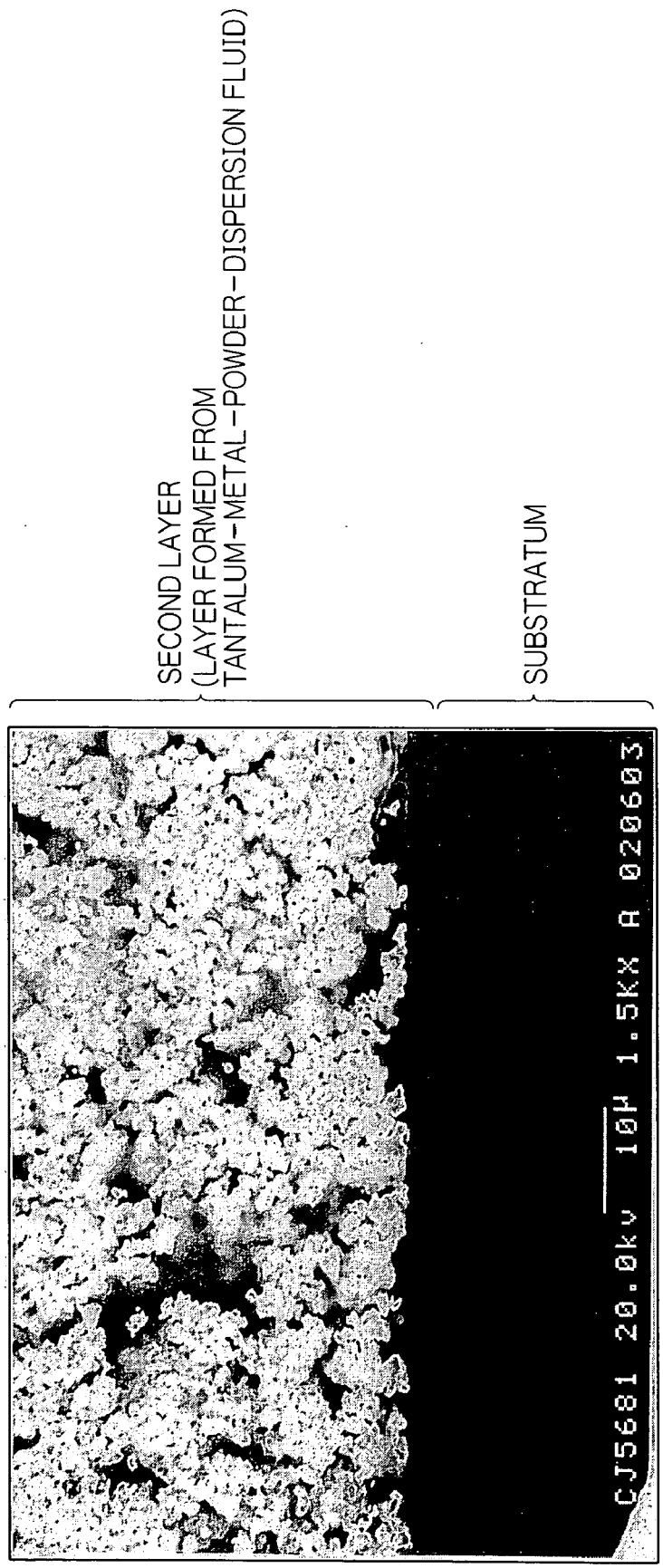
FIG. 12 is a SEM image of the cross-section of the molding with a substratum in Comparative Example 1.

An image of the cross-section of the obtained molding with substratum is shown in FIG. 12.

Figure 13A:
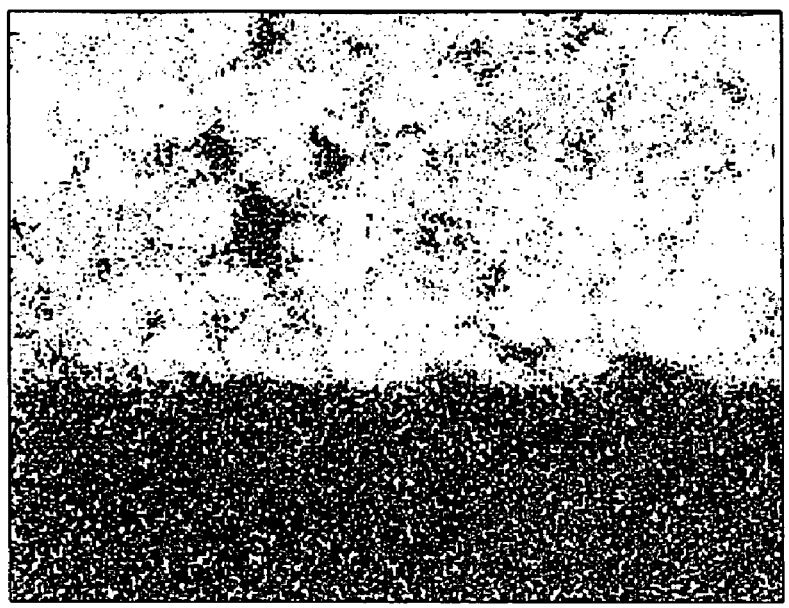
FIGS. 13A and 13B are views of mapping data for tantalum atoms and carbon atoms, respectively, in the cross-section shown in FIG. 12.
Figure 13B:
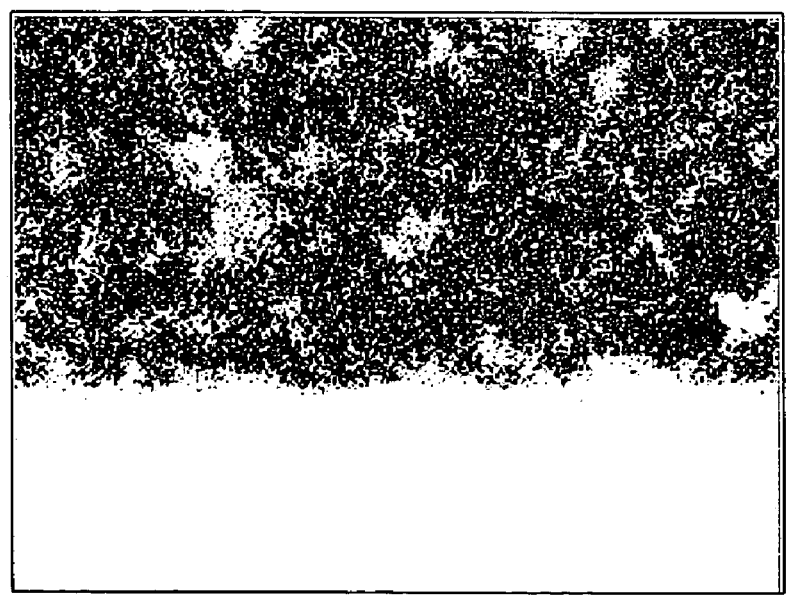

Mapping data of these carbon atoms and tantalum atoms are shown respectively in FIG. 13A and 13B. Here, mapping data was obtained using the same measurement conditions as in Example 1.

The ratio of the number of atoms Catm/Taatm for the amount of tantalum atoms present and the amount of carbon atoms present on the substratum side surface of the molding for the electrolytic capacitor anode element, and the ratio of the number of atoms Catm/Taatm on the opposite surface was measured. Each was found to be 0.60 to 0.75.

(Formation of Electrolytic Capacitor Anode Element)

Example 5

Using the molding with the substratum obtained in Examples 1 and 2, an electrolytic capacitor anode element was produced in the following manner.

Using a slitter, the molding was slit to a width of 3.6 mm with the PET (substratum), and the molding with the substratum was wound into a reel.

Next, the molding wound into a reel was separated from the PET, spread out in a straight line, and then chipped by cutting into 3.6×4.4 mm sizes. Next, the flat portion of a flat lead wire formed by applying pressure to flatten the tip of a 0.2 mm diameter lead wire was sandwiched between the moldings and stacked, to form a molding element 15 for an electrolytic capacitor anode element shown in FIG. 5.

Next, the molding element 15 for an electrolytic capacitor anode element was heated to 350° C. in a vacuum at $6.6 \times 10^{-3}$ Pa ($5 \times 10^{-5}$ torr) and subjected to a heat treatment for 90 minutes to decompose and remove the organic material (binder). A sintering treatment was then carried out at 1300° C. for 20 minutes, as a result, a tantalum electrolytic capacitor anode element 18 was obtained having a structure as shown in FIG. 6, in which the flat portion 13a of the flat lead wire 13 was embedded inside a thin rectangular tantalum porous sintered body 17.

Because mechanical strength of the molding for an electrolytic capacitor anode element was provided by the protective layer having resin as a main component in this way, the shape of the reel or the chip of molding was maintained throughout the processing steps, i.e., throughout slitting, separating the substratum, spreading in a straight line, cutting, sandwiching and pressurizing the lead wire, etc., even under impacts during bending, cutting, etc. or under pressure application when forming a unitary structure with the lead wire. So workability of the molding for electrolytic capacitor anode element was extremely good. Further, since the molding element for an electrolytic capacitor anode element could be continuously formed from a reeled molding, the production efficiency was extremely good for the molding element for an electrolytic capacitor anode element and the electrolytic capacitor anode element.

Comparative Example 2

Using the molding element for the electrolytic capacitor anode element obtained in Comparative Example 1, an electrolytic capacitor anode element was produced in the same manner as Example 2.

However, after separating from the PET, the shape of the molding gave way and processing could not be carried out.

By comparing the Examples according to the present invention with the Comparative Examples based on these results, it was confirmed that the molding for an electrolytic capacitor anode element having excellent workability, such that an improvement in production efficiency could be anticipated, even when the amount of binder employed in a metal-powder-dispersion fluid was reduced to decrease the amount of residual carbon after sintering.

INDUSTRIAL APPLICABILITY

The present invention provides mechanical strength to the molding through the provision of a protective layer having resin as a main component, as a result, even when the amount of binder resin included in the porous-body-forming layer is reduced so that the amount of residual carbon after sintering can be decreased, the present invention enables provision of a molding having excellent workability.

In addition, since the protective layer having resin as a main component that is for protecting the valve action metal may be disposed in the surface of the molding, it is easy to remove the carbon during sintering. As a result, when employing the molding (present invention) in an electrolytic capacitor anode element, it is possible to form an electrolytic capacitor anode element with excellent workability and excellent electric properties as low leakage current.

What is claimed is:

1. A molding for an electrolytic capacitor anode element having valve action metal layer which includes valve action metal powder and binder resin, said molding comprising a region having resin as its main component for protecting said valve action metal layer in at least one surface of said molding.

2. A molding for an electrolytic capacitor anode element according to claim 1, wherein said valve action metal layer includes said valve action metal powder and said binder resin in the form of a mixture thereof.

3. A molding with a substratum comprising a sheet-shaped substratum and a molding provided on said sheet-shaped substratum such that said molding can be separated, wherein: said molding has a protective layer and a porous-body-forming layer; said protective layer has resin as a main component; and said porous-body-forming layer has valve action metal powder and binder resin.

4. A molding with a substratum according to claim 3, wherein said protective layer is present on said sheet-shaped substratum, and said porous-body-forming layer is present on said protective layer.

5. A molding with a substratum according to claim 3, wherein the adhesive strength between said protective layer and said porous-body-forming layer is greater than the adhesive strength between said sheet-shaped substratum and said protective layer.

6. A molding with a substratum according to claim 3, wherein said protective layer and said porous-body-forming layer were formed in a unitary manner by after forming a coated film on the sheet-shaped substratum by coating a paint for the porous-body-forming layer that includes valve action metal powder and binder resin, settling down said valve action metal powder in said coated film.

7. A molding with a substratum according to any one of claims 3 to 6, wherein said molding is a molding for an electrolytic capacitor anode element.

8. A molding with a substratum according to claim 7, wherein said valve action metal powder is tantalum powder or niobium powder.

9. A molding with a substratum according to any one of claims 3 to 6, wherein said resin included in said protective layer as a main component comprises at least one selected from among the group of polyvinyl resin, polyvinyl acetal resin, butyral resin, and acrylic resin.

10. A molding with a substratum according to claim 3, wherein said molding with a substratum is wound into a reel.

11. A molding with a substratum according to claim 10, wherein said molding with a substratum is slit.

12. A molding with a substratum according to claim 3, wherein said porous-body-forming layer has said valve action metal powder and said binder resin in the form of a mixture thereof.

13. A production method for a molding with a substratum, comprising a step for forming a protective layer having resin as a main component on a sheet-shaped substratum, and a step for forming a porous-body-forming layer having valve action metal powder and binder resin on said protective layer, wherein the adhesive strength between said protective layer and said porous-body-forming layer is made to be greater than the adhesive strength between said substratum and said protective layer.

14. A production method for a molding with a substratum, comprising: a step for forming a coated film by coating a paint that includes valve action metal powder and binder resin on a sheet-shaped substratum; and a step for forming a porous-body-forming layer having said valve action metal powder and said binder resin, and a protective layer having resin as a main component positioned on the surface of said porous-body-forming layer, by settling down said valve action metal powder in said coated film.

15. A production method for a molding with a substratum according to claim 13 or 14, wherein the resin forming said protective layer having resin as a main component comprises at least one selected from among the group of polyvinyl resin, polyvinyl acetal resin, butyral resin, and acrylic resin.

16. A production method fora molding with a substratum according to claim 13 or 14, wherein said valve action metal powder is tantalum powder or niobium powder.

17. A production method for an electrolytic capacitor anode element comprising: a first step for separating said molding from said sheet-shaped substrate of said molding with a substrate produced by the production method of claim 13 or 14, and cutting said molding to a specific dimension, and a second step for applying pressure on a plurality of cut moldings with a lead wire sandwiched therebetween, followed by sintering.

* * * * *